(12) United States Patent
Nanri

(10) Patent No.: US 10,356,609 B2
(45) Date of Patent: Jul. 16, 2019

(54) BASE STATION APPARATUS AND METHOD OF SETTING CELL ID

(75) Inventor: Masahiko Nanri, Kanagawa (JP)

(73) Assignee: Sun Patent Trust, New York, NY (US)

( * ) Notice: Subject to any disclaimer, the term of this patent is extended or adjusted under 35 U.S.C. 154(b) by 561 days.

(21) Appl. No.: 13/203,808

(22) PCT Filed: Feb. 2, 2010

(86) PCT No.: PCT/JP2010/000612
§ 371 (c)(1),
(2), (4) Date: Aug. 29, 2011

(87) PCT Pub. No.: WO2010/100823
PCT Pub. Date: Sep. 10, 2010

(65) Prior Publication Data
US 2011/0310805 A1    Dec. 22, 2011

(30) Foreign Application Priority Data

Mar. 2, 2009   (JP) .................. 2009-048473

(51) Int. Cl.
| | |
|---|---|
| *H04W 8/26* | (2009.01) |
| *H04L 29/12* | (2006.01) |
| *H04W 56/00* | (2009.01) |
| *H04W 16/10* | (2009.01) |
| *H04W 84/04* | (2009.01) |
| *H04W 88/08* | (2009.01) |

(52) U.S. Cl.
CPC ........... *H04W 8/26* (2013.01); *H04L 61/2015* (2013.01); *H04W 16/10* (2013.01); *H04W 56/00* (2013.01); *H04W 84/045* (2013.01); *H04W 88/08* (2013.01)

(58) Field of Classification Search
CPC ..... H04W 84/045; H04W 36/14; H04W 4/02; H04W 4/22; H04W 88/08; H04W 36/0022; H04W 36/04; H04W 48/18
USPC ................................................. 370/328–329
See application file for complete search history.

(56) References Cited

U.S. PATENT DOCUMENTS

| | | |
|---|---|---|
| 7,460,506 B2 | 12/2008 | Ro |
| 7,990,912 B2 | 8/2011 | Nix |
(Continued)

FOREIGN PATENT DOCUMENTS

| | | |
|---|---|---|
| JP | 2007-6003 | 1/2007 |
| JP | 2007-96464 | 4/2007 |
(Continued)

OTHER PUBLICATIONS

International Search Report dated Mar. 16, 2010.
(Continued)

*Primary Examiner* — Asad M Nawaz
*Assistant Examiner* — Najeeb Ansari
(74) *Attorney, Agent, or Firm* — Dickinson Wright, PLLC

(57) ABSTRACT

A base station apparatus installed by a general user, wherein a cell ID can be easily set in cases when setting of a cell ID is necessary. In this apparatus, a DHCP message reception unit (105) receives a DHCPACK message from a DHCP server. An IP address extraction unit (107) extracts an IP address stored in the IP address field of the DHCPACK message. A cell ID determining unit (108) sets a unique cell ID for this base station apparatus based on the IP address extracted by the IP address extraction unit (107).

7 Claims, 10 Drawing Sheets

(56) References Cited

U.S. PATENT DOCUMENTS

| | | | |
|---|---|---|---|
| 8,855,007 B2* | 10/2014 | Gupta et al. | 370/254 |
| 2002/0123365 A1* | 9/2002 | Thorson et al. | 455/524 |
| 2003/0043781 A1* | 3/2003 | Proctor et al. | 370/352 |
| 2003/0095520 A1* | 5/2003 | Aalbers | H04L 29/06 370/338 |
| 2005/0209008 A1 | 9/2005 | Shimizu | |
| 2005/0265293 A1 | 12/2005 | Ro | |
| 2006/0004643 A1 | 1/2006 | Stadelmann | |
| 2006/0206597 A1* | 9/2006 | Kim et al. | 709/220 |
| 2006/0291659 A1 | 12/2006 | Watanabe | |
| 2007/0264996 A1* | 11/2007 | Vikberg | 455/426.1 |
| 2007/0293222 A1* | 12/2007 | Vikberg et al. | 455/436 |
| 2008/0112356 A1* | 5/2008 | Jung | H04L 5/0053 370/328 |
| 2008/0123852 A1* | 5/2008 | Jiang | 380/273 |
| 2008/0174491 A1* | 7/2008 | Kim et al. | 342/450 |
| 2008/0225840 A1* | 9/2008 | Yang et al. | 370/389 |
| 2008/0244148 A1 | 10/2008 | Nix | |
| 2009/0010199 A1* | 1/2009 | Adachi et al. | 370/315 |
| 2009/0047945 A1* | 2/2009 | Zhang | H04W 84/045 455/424 |
| 2009/0052395 A1* | 2/2009 | Bao et al. | 370/331 |
| 2009/0070582 A1* | 3/2009 | Aura et al. | 713/168 |
| 2009/0106404 A1* | 4/2009 | Christenson | 709/222 |
| 2009/0164547 A1* | 6/2009 | Ch'ng et al. | 709/201 |
| 2009/0238114 A1* | 9/2009 | Deshpande | H04J 11/0069 370/328 |
| 2010/0008323 A1* | 1/2010 | Deshpande | H04W 48/12 370/331 |
| 2010/0041365 A1* | 2/2010 | Lott et al. | 455/406 |
| 2010/0105377 A1 | 4/2010 | Iwamura | |
| 2010/0105395 A1* | 4/2010 | Ji et al. | 455/444 |
| 2010/0184421 A1* | 7/2010 | Lindqvist | H04J 11/0069 455/418 |
| 2010/0195621 A1* | 8/2010 | Kekki | H04W 48/17 370/332 |
| 2010/0203891 A1* | 8/2010 | Nagaraja | H04W 36/0055 455/436 |
| 2010/0210258 A1* | 8/2010 | Nylander | H04W 16/10 455/422.1 |
| 2011/0128916 A1* | 6/2011 | Kwon | H04W 84/18 370/328 |
| 2011/0246629 A1* | 10/2011 | Savolainen | H04W 60/005 709/220 |
| 2012/0020293 A1 | 1/2012 | Nix | |
| 2012/0269162 A1* | 10/2012 | Vesterinen | H04W 8/082 370/331 |
| 2012/0297055 A9* | 11/2012 | Raleigh | 709/224 |

FOREIGN PATENT DOCUMENTS

| | | |
|---|---|---|
| JP | 2008-28892 | 2/2008 |
| JP | 2008-172380 | 7/2008 |
| JP | 2008-183426 | 8/2008 |
| KR | 10-2005-0113441 | 12/2005 |
| KR | 10-2008-0056423 | 6/2008 |

OTHER PUBLICATIONS

English translation of Office Action dated Feb. 20, 2014.
Extended European Search Report dated Dec. 17, 2014, 8 pages total.
"Method for Generating Unique Identifiers by Using Low-Resolution Timestamps," XP000383619, IBM Technical Disclosure Bulletin, vol. 36, No. 7, Jul. 1993, pp. 245.

* cited by examiner

F.I.G. 1

BASE STATION APPARATUS AND METHOD OF SETTING CELL ID

TECHNICAL FIELD

The present invention relates to a base station apparatus and a method of setting a cell ID. More particularly, the present invention relates to a base station apparatus that autonomously determines a cell ID when a user installs the base station apparatus and a method of setting a cell ID.

BACKGROUND ART

Conventionally, for a base station apparatus in a macro cell or the like, experts conduct field investigation in advance, and perform station placement design and parameter optimization (e.g. see Patent Literature 1). Therefore, the base station apparatus in a macro cell or the like is normally assigned a cell ID that minimizes inter-cell interference between neighboring cells.

Furthermore, the development of small base station apparatuses called "femto cells" is in progress to eliminate dead zones of mobile phones in recent years. Unlike the macro cell, the femto cell is installed by a general user as appropriate. Therefore, the femto cell is installed by the user in an arbitrary place without considering any interference with peripheral cells.

FIG. 1 is a diagram illustrating cells adjacent to each other. In FIG. 1, when, for example, a cell ID of macro cell #1 is "0xAC80" and a cell ID of macro cell #2 is "0xB92F," macro cell #1 and macro cell #2 adjacent to each other do not interfere with each other. On the other hand, as shown in FIG. 1, when a general user installs femto cell #3 adjacent to both macro cell #1 and macro cell #2, if a cell ID of femto cell #3 is "0xAC80," the cell ID of macro cell #1 is identical to the cell ID of femto cell #3, and therefore macro cell #1 and femto cell #3 interfere with each other. When such inter-cell interference occurs, it is necessary to reset parameters of the femto cell.

Citation List
Patent Literature
PTL 1
Japanese Patent Application Laid-Open No. 2008-172380

SUMMARY OF INVENTION

Technical Problem

However, conventionally, there is a problem that it is difficult for a general user lacking expertise to change the cell ID setting. Furthermore, to prevent inter-cell interference caused by installing a femto cell, a method may be considered which randomly assigns parameters to a femto cell in advance before shipment of the femto cell. However, since a femto cell is installed by a general user in an arbitrary place in this case, too, there is a possibility that the femto cell may be located adjacent to a macro cell or another femto cell assigned a cell ID having a high correlation with the cell ID assigned to the femto cell, in which case it will be necessary to reset parameters of the femto cell.

It is therefore an object of the present invention to provide, when setting of a cell ID is necessary in a base station apparatus installed by a general user, a base station apparatus and a method of setting a cell ID capable of easily setting the cell ID.

Solution to Problem

A base station apparatus of the present invention adopts a configuration including a receiving section that receives a message from a server, an extraction section that extracts parameters included in the received message and a setting section that sets a cell ID specific to the base station based on the extracted parameters.

A method of setting a cell ID of the present invention is a method of setting a cell ID for a base station apparatus for which a cell ID can be set as appropriate, including a step of receiving a message from a server, a step of extracting parameters included in the received message and a step of setting the cell ID specific to the base station apparatus based on the extracted parameters.

Advantageous Effects of Invention

According to the present invention, when setting of a cell ID is necessary in a base station apparatus installed by a general user, it is possible to easily set the cell ID.

DESCRIPTION OF EMBODIMENTS

Now, embodiments of the present invention will be described in detail with reference to the accompanying drawings.

Embodiment 1

Figure 1:
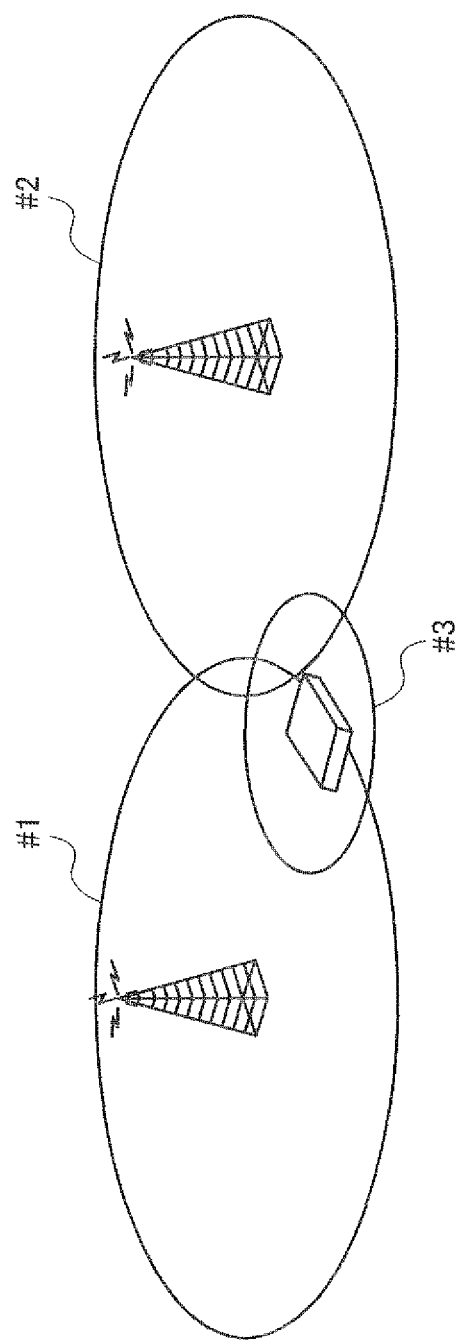
FIG. 1 is a diagram illustrating cells adjacent to each other.
Figure 2:
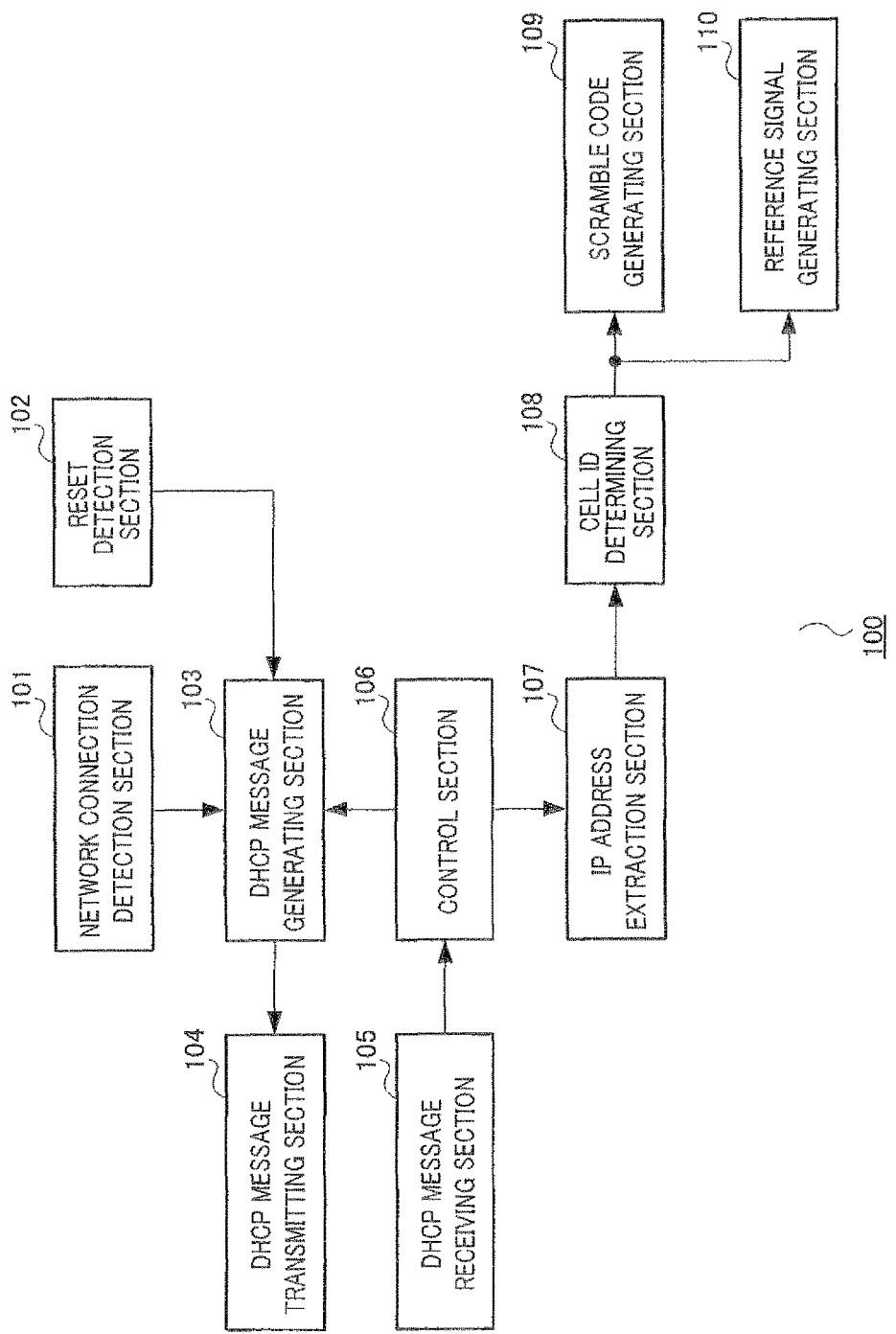
FIG. 2 is a block diagram showing the configuration of a base station apparatus according to Embodiment 1 of the present invention.

FIG. 2 is a block diagram showing the configuration of base station apparatus 100 according to Embodiment 1 of the present invention. Base station apparatus 100 is, for example, a femto cell and is a small base station apparatus that can be installed by a general user.

Base station apparatus 100 is mainly comprised of network connection detection section 101, reset detection section 102, DHCP (dynamic host configuration protocol) message generating section 103, DHCP message transmitting section 104, DHCP message receiving section 105, control section 106, IP address extraction section 107, cell ID determining section 108, scramble code generating section 109 and reference signal generating section 110.

Network connection detection section 101 detects whether or not a connection is made to a network and outputs, when a connection to a network is detected, the detection result to DHCP message generating section 103.

Reset detection section 102 detects whether or not a reset is performed and outputs, when a reset is detected, the detection result to DHCP message generating section 103.

When the network connection detection result is inputted from network connection detection section 101 or the reset detection result is inputted from reset detection section 102, DHCP message generating section 103 generates a DHCP-DISCOVER message. Furthermore, DHCP message generating section 103 outputs the DHCPDISCOVER message generated to DHCP message transmitting section 104. Furthermore, DHCP message generating section 103 generates a DHCPREQUEST message directed to a DHCP server indicated from control section 106 and outputs the DHCPREQUEST message generated to DHCP message transmitting section 104.

DHCP message transmitting section 104 broadcasts the DHCPDISCOVER message inputted from DHCP message generating section 103 to the DHCP server (not shown). Furthermore, DHCP message transmitting section 104 broadcasts the DHCPREQUEST message inputted from DHCP message generating section 103.

DHCP message receiving section 105 receives a DHCPOFFER message or DHCPACK message from the DHCP server (not shown) and outputs the received DHCPOFFER message or DHCPACK message to control section 106.

Control section 106 selects one DHCP server based on the DHCPOFFER message inputted from DHCP message receiving section 105. Control section 106 instructs DHCP message generating section 103 to transmit the DHCPREQUEST message to the selected DHCP server. Furthermore, control section 106 outputs the DHCPACK message inputted from DHCP message receiving section 105 to IP address extraction section 107.

IP address extraction section 107 extracts an IP address, which is a dynamic parameter assigned to base station apparatus 100 by the DHCP server, stored in an IP address field of the DHCPACK message inputted from control section 106. IP address extraction section 107 then outputs the extracted IP address to cell ID determining section 108.

Cell ID determining section 108 sets a cell ID specific to base station apparatus 100 based on the IP address inputted from IP address extraction section 107. Cell ID determining section 108 then outputs the set cell ID to scramble code generating section 109 and reference signal generating section 110. Here, a "cell ID" is an ID for identifying a cell and converted into numbers so as to indicate a numerical value which differs from one cell to another.

Scramble code generating section 109 generates a scramble code necessary to transmit a downlink signal using the cell ID inputted from cell ID determining section 108.

Reference signal generating section 110 generates a reference signal necessary to transmit a downlink signal using the cell ID inputted from cell ID determining section 108.

Figure 3:
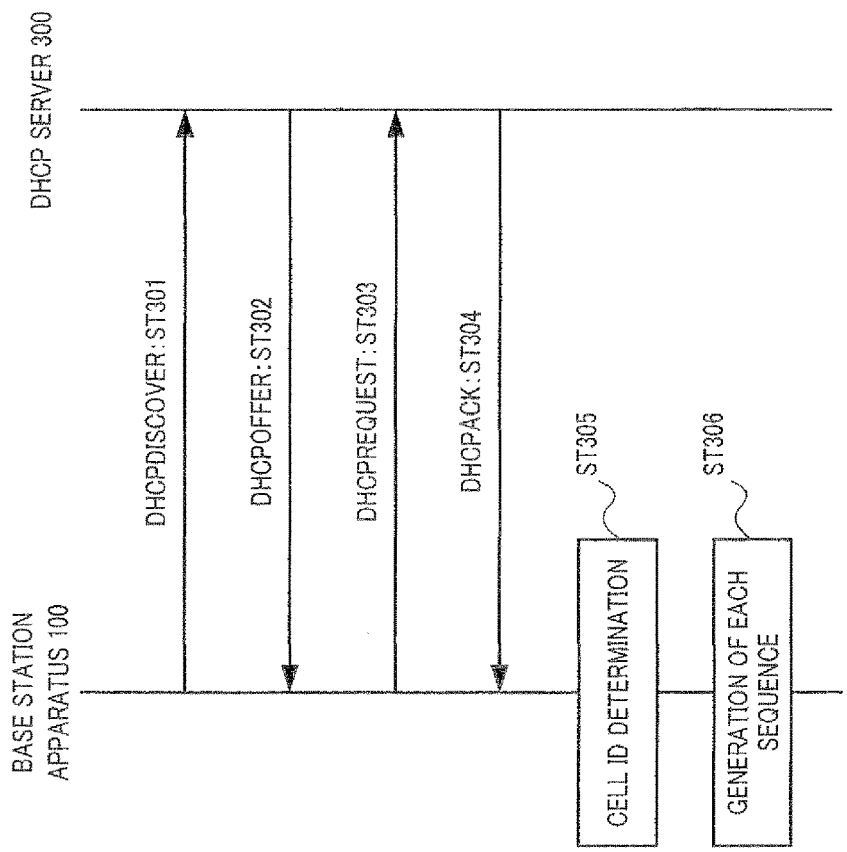
FIG. 3 is a sequence diagram showing a method of setting a cell ID according to Embodiment 1 of the present invention.

Next, the method of setting a cell ID by base station apparatus 100 will be described using FIG. 3. FIG. 3 is a sequence diagram showing the method of setting a cell ID.

First, network connection detection section 101 of base station apparatus 100 detects a connection to a network, DHCP message generating section 103 generates a DHCP-DISCOVER message and DHCP message transmitting section 104 broadcasts a DHCPDISCOVER message (step ST301).

Next, DHCP server 300 receives the DHCPDISCOVER message and transmits a DHCPOFFER message including information of the IP address or the like to the MAC address of base station apparatus 100 as a response to the received DHCPDISCOVER message (step ST302).

When a plurality of DHCP servers 300 are present, DHCP message receiving section 105 of base station apparatus 100 receives a plurality of DHCPOFFER messages. Control section 106 of base station apparatus 100 then selects one DHCP server 300, DHCP message generating section 103 generates a DHCPREQUEST message directed to the selected DHCP server and DHCP message transmitting section 104 broadcasts the DHCPREQUEST message (step ST303).

Next, DHCP server 300 which has received the DHCPREQUEST message transmits a DHCPACK message including configuration information (step ST304). In this case, the IP address assigned to base station apparatus 100 is inserted in the IP address field of the DHCPACK message.

IP address extraction section 107 of base station apparatus 100 which has received the DHCPACK message checks parameters such as IP address included in the DHCPACK message and extracts the IP address.

Furthermore, cell ID determining section 108 determines a cell ID based on the IP address (step ST305). In this case, cell ID determining section 108 sets 16 least significant bits (LSB) of the IP address as the cell ID. For example, when the IP address is represented in hexadecimals "1234::467d:01.23:004d:::22a1," cell ID determining section 108 adds "0x" to the more significant bit side of "22a1" which is the LSB and sets "0x22a1" as the cell ID. Not only the least significant bits of the IP address are set as the cell ID, but arbitrary bits of the IP address such as the most significant bits of the IP address may be set as the cell ID.

Next, scramble code generating section 109 of base station apparatus 100 generates a scramble code necessary to transmit a downlink signal from the cell ID and reference signal generating section 110 generates a reference signal necessary to transmit the downlink signal from the cell ID (generation of each sequence) (step ST306).

Next, when a reset switch is pressed, reset detection section 102 of base station apparatus 100 instructs DHCP message generating section 103 to start the processing in step ST301 to repeat the operations in step ST301 to step ST306 again.

Figure 4:
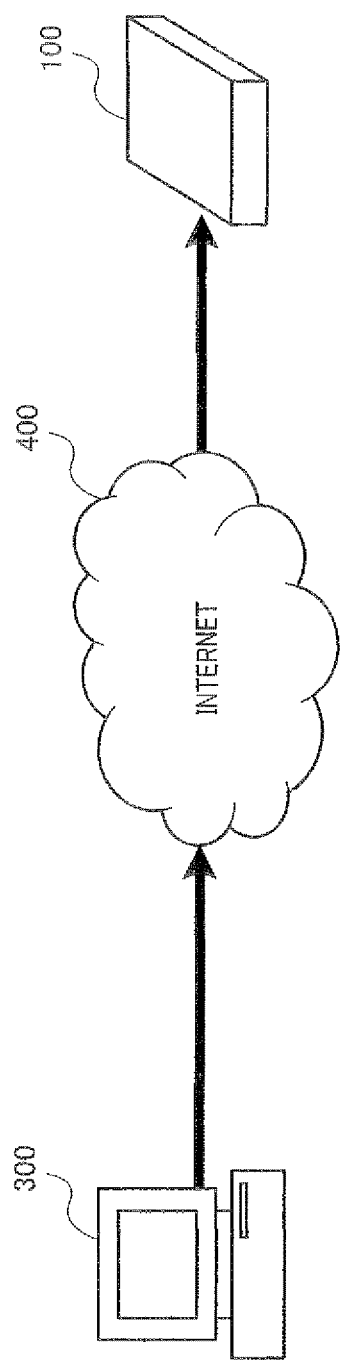
FIG. 4 is a diagram illustrating a connection state between a DHCP server and the base station apparatus according to Embodiment 1 of the present invention.

FIG. 4 is a diagram illustrating a connection state between the DHCP server and the base station apparatus.

In FIG. 4, base station apparatus 100 is connected to DHCP server 300 via Internet 400. DHCP server 300 then transmits a DHCPACK message including the IP address of IPv6 to base station apparatus 100 via Internet 400.

Thus, according to the present embodiment, the base station apparatus sets the cell ID of the base station apparatus from the IP address assigned thereto, and can thereby easily set the cell ID when the cell ID needs to be set in the base station apparatus installed by a general user. Furthermore, according to the present embodiment, by causing the base station apparatus to autonomously set the cell ID using the IP address, it is possible to operate the base station apparatus on a plug-and-play basis. Furthermore, since the present embodiment sets the cell ID using the IP address, it is not necessary to transmit/receive dedicated information for the cell ID setting, and it is thereby possible to set the cell ID as appropriate without increasing processing load on the base station apparatus.

Embodiment 2

Figure 5:
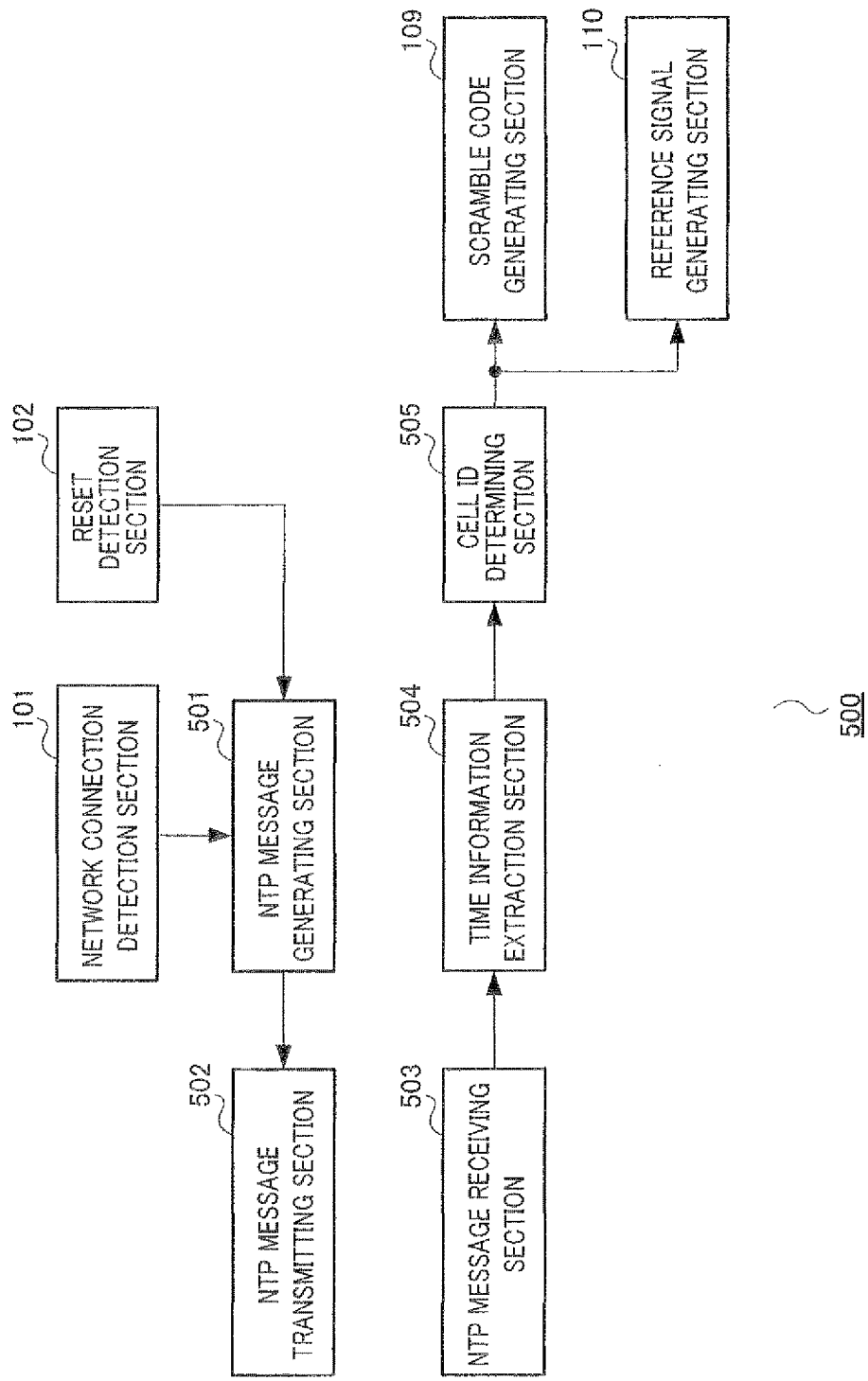
FIG. 5 is a block diagram showing the configuration of a base station apparatus according to Embodiment 2 of the present invention.

FIG. 5 is a block diagram showing the configuration of base station apparatus 500 according to Embodiment 2 of the present invention. Base station apparatus 500 is, for example, a femto cell and is a small base station apparatus that can be installed by a general user.

Compared to base station apparatus 100 according to Embodiment 1 shown in FIG. 2, base station apparatus 500 shown in FIG. 5 removes DHCP message generating section 103, DHCP message transmitting section 104, DHCP message receiving section 105 and IP address extraction section 107, adds NTP (Network Time Protocol) message generating section 501, NTP message transmitting section 502, NTP message receiving section 503 and time information extraction section 504, and replaces cell ID determining section 108 by cell ID determining section 505. In FIG. 5, the same components as those in FIG. 2 will be assigned the same reference numerals and descriptions thereof will be omitted.

Base station apparatus 500 is mainly comprised of network connection detection section 101, reset detection section 102, scramble code generating section 109, reference signal generating section 110, NTP message generating section 501, NTP message transmitting section 502, NTP message receiving section 503 and time information extraction section 504 and cell ID determining section 505.

Network connection detection section 101 detects whether or not a connection to a network is made, and outputs, when a connection to a network is detected, the detection result to NTP message generating section 501.

Reset detection section 102 detects whether or not a reset is performed, and outputs, when a reset is detected, the detection result to NTP message generating section 501.

NIP message generating section 501 generates a NTPREQUEST message when the network connection detection result is inputted from network connection detection section 101 or the reset detection result is inputted from reset detection section 102. Furthermore, NTP message generating section 501 outputs the NTPREQUEST message generated to NTP message transmitting section 502.

NTP message transmitting section 502 transmits the NTPREQUEST message inputted from NTP message generating section 501 to an NTP server (not shown).

NTP message receiving section 503 receives a NTPRESPONSE message from the NTP server (not shown) and outputs the received NTPRESPONSE message to time information extraction section 504.

Time information extraction section 504 extracts time information which is a dynamic parameter from the NTPRESPONSE message inputted from NTP message receiving section 503 and outputs the extracted time information to cell ID determining section 505. Here, the time of the time information is, for example, the time base station apparatus 500 is powered on. Furthermore, the time information is, for example, a time stamp.

Cell ID determining section 505 sets a cell ID specific to base station apparatus 500 based on the time information inputted from time information extraction section 504. Cell ID determining section 505 outputs the set cell ID to scramble code generating section 109 and reference signal generating section 110.

Scramble code generating section 109 generates a scramble code necessary to transmit a downlink signal using the cell ID inputted from cell ID determining section 505.

Reference signal generating section 110 generates a reference signal necessary to transmit a downlink signal using the cell ID inputted from cell ID determining section 505.

Figure 6:
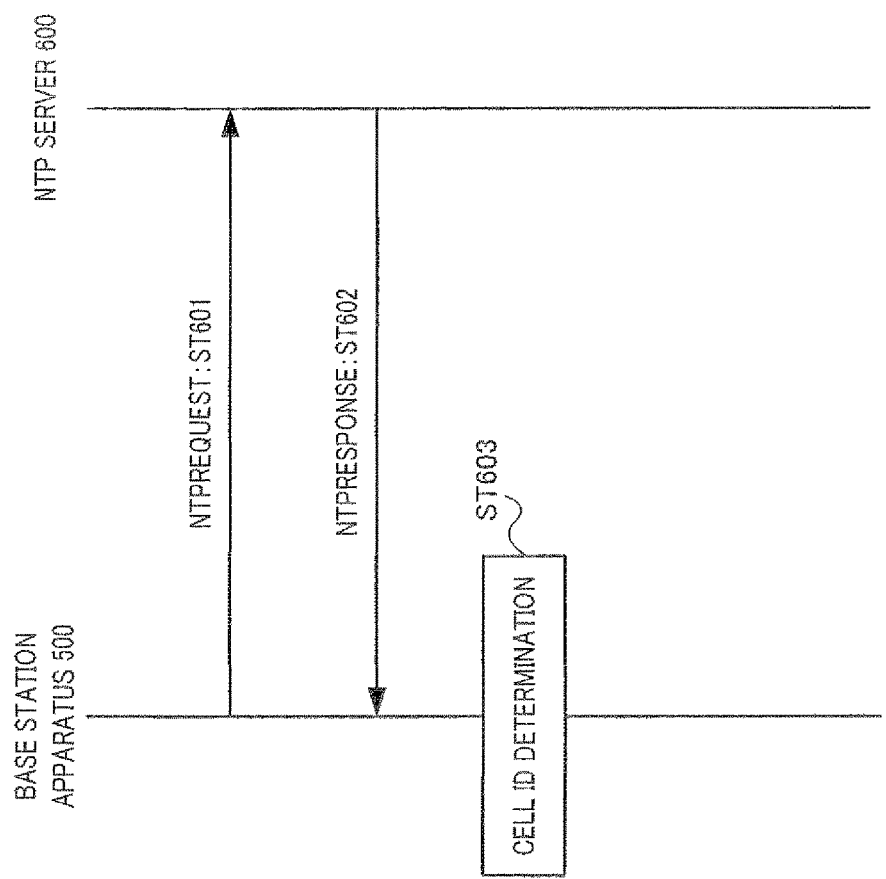
FIG. 6 is a sequence diagram showing a method of setting a cell ID according to Embodiment 2 of the present invention.

Next, a method of setting a cell ID in base station apparatus 500 will be described using FIG. 6. FIG. 6 is a sequence diagram showing the method of setting a cell ID.

First, network connection detection section 101 of base station apparatus 500 detects a connection to a network, NTP message generating section 501 generates a NTPREQUEST message and NTP message transmitting section 502 transmits the NTPREQUEST message to NTP server 600 (step ST601).

Next, NTP server 600 receives the NTPREQUEST message and transmits a NTPRESPONSE message including time information to base station apparatus 500 as a response to the received NTPREQUEST message (step ST602). For example, NTP server 600 transmits a NTPRESPONSE message including "0x23B6D280" as the time information.

Next, NTP message receiving section 503 of base station apparatus 500 receives the NTPRESPONSE message. Time information extraction section 504 of base station apparatus 500 extracts the time information from the NTPRESPONSE message.

Cell ID determining section 505 of base station apparatus 500 determines a cell ID based on the time information (step ST603). In this case, cell ID determining section 505 sets the least significant 16 bits of the time information as the cell ID. For example, cell ID determining section 505 adds "0x" to a more significant bit side of the least significant bits "D280" of time stamp "0x23B6D280" and sets "0xD280" as the cell ID. Not only the least significant bits of the time stamp are set as the cell ID, but arbitrary bits of the time stamp of the most significant bits of the time stamp can be set as the cell ID.

Next, scramble code generating section 109 of base station apparatus 500 generates a scramble code necessary to transmit a downlink signal from the cell ID and reference signal generating section 110 generates a reference signal necessary to transmit a downlink signal from the cell ID.

Furthermore, when the reset switch is pressed, reset detection section 102 of base station apparatus 500 instructs NTP message generating section 501 to start the processing in step ST601 in order to repeat the operations in step ST601 to step ST603 again.

Figure 7:
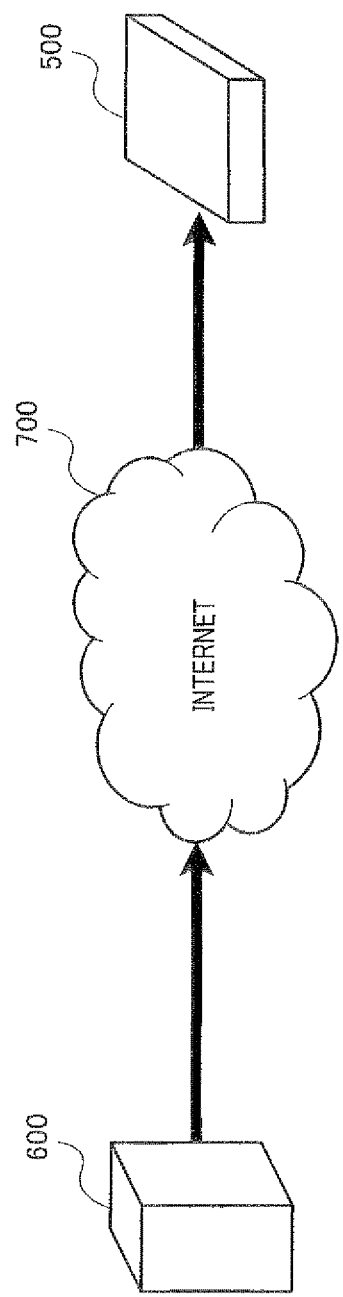
FIG. 7 is a diagram illustrating a connection state between an NTP server and the base station apparatus according to Embodiment 2 of the present invention.

FIG. 7 is a diagram illustrating a connection state between the NTP server and the base station apparatus.

In FIG. 7, base station apparatus 500 makes a connection to NTP server 600 via Internet 700. NTP server 600 then transmits a NTPRESPONSE message including time information to base station apparatus 500 via Internet 700.

Thus, according to the present embodiment, the base station apparatus sets the cell ID of the base station apparatus from the time information when power is turned on, and can thereby easily set a cell ID when setting of the cell ID is necessary in the base station apparatus installed by a general user. Furthermore, according to the present embodiment, the base station apparatus autonomously sets the cell ID using the time information, and it is thereby possible to cause the base station apparatus to operate on a plug-and-play basis. Furthermore, since the cell. ID is set using time information according to the present embodiment, it is not necessary to transmit/receive dedicated information for the cell ID setting and it is thereby possible to set the cell ID as appropriate without increasing processing load on the base station apparatus.

In the present embodiment, the time information is acquired from the NTP server, but the present embodiment is not limited to this and the time information can also be acquired from a GPS satellite.

Embodiment 3

Figure 8:
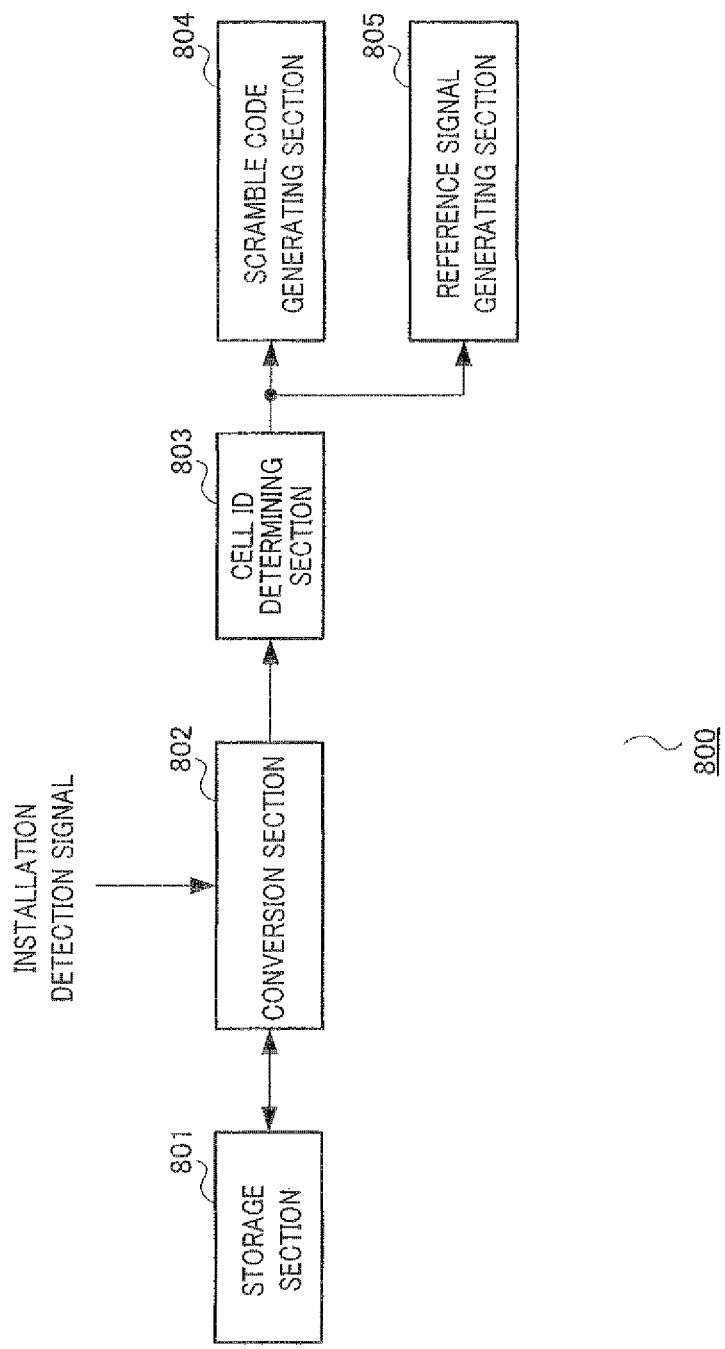
FIG. 8 is a block diagram showing the configuration of a base station apparatus according to Embodiment 3 of the present invention.

FIG. 8 is a block diagram showing the configuration of base station apparatus 800 according to Embodiment 3 of the present invention. Base station apparatus 800 is, for example, a femto cell and is a small base station apparatus that can be installed by a general user.

Base station apparatus 800 is mainly comprised of storage section 801, conversion section 802, cell ID determining section 803, scramble code generating section 804 and reference signal generating section 805.

Storage section 801 stores a base station apparatus name which is a dynamic parameter set in base station apparatus 800 beforehand. Here, the base station apparatus name is, for example, femto cell name "LTEfemto."

Conversion section 802 stores an ASCII code table beforehand. Furthermore, upon receiving an installation detection signal detecting that base station apparatus 800 has been installed by the user as input, conversion section 802 reads the base station apparatus name of base station apparatus 800 from storage section 801. Furthermore, conversion section 802 converts the read base station apparatus name to an ASCII code corresponding thereto using the ASCII code table. For example, conversion section 802 converts base station apparatus name "LTEfemto" to ASCII code "0x4C544566656D746F" corresponding thereto using the ASCII code table. Conversion section 802 then outputs the converted ASCII code to cell ID determining section 803.

Cell ID determining section 803 sets a cell ID specific to base station apparatus 800 based on the ASCII code inputted from conversion section 802. For example, cell ID determining section 803 extracts "746F" from ASCII code "0x4C544566656D746F," adds "0x" to the more significant bit side of extracted "746F" and sets "0x746F" as the cell ID. Cell ID determining section 803 then outputs the set cell ID to scramble code generating section 804 and reference signal generating section 805.

Scramble code generating section 804 generates a scramble code necessary to transmit a downlink signal using the cell ID inputted from cell ID determining section 803.

Reference signal generating section 805 generates a reference signal necessary to transmit a downlink signal using the cell ID inputted from cell ID determining section 803.

Thus, according to the present embodiment, the base station apparatus sets the cell ID of the base station apparatus from the stored base station apparatus name, and can thereby easily set the cell ID when the cell ID needs to be set in the base station apparatus installed by a general user. Furthermore, according to the present embodiment, the base station apparatus autonomously sets the cell ID using the name of the base station apparatus, which allows the base station apparatus to operate by plug and play. Furthermore, the present embodiment sets a cell ID using the name of the base station apparatus, eliminates the necessity of storing dedicated information for the cell ID setting, and can thereby set the cell ID as appropriate without increasing the capacity of memory mounted on the base station apparatus.

The present embodiment sets a cell ID using the name of the base station apparatus, but the present embodiment is not limited to this, and can set a cell ID using arbitrary information other than the name of the base station apparatus that can be converted to an ASCII code.

Embodiment 4

Figure 9:
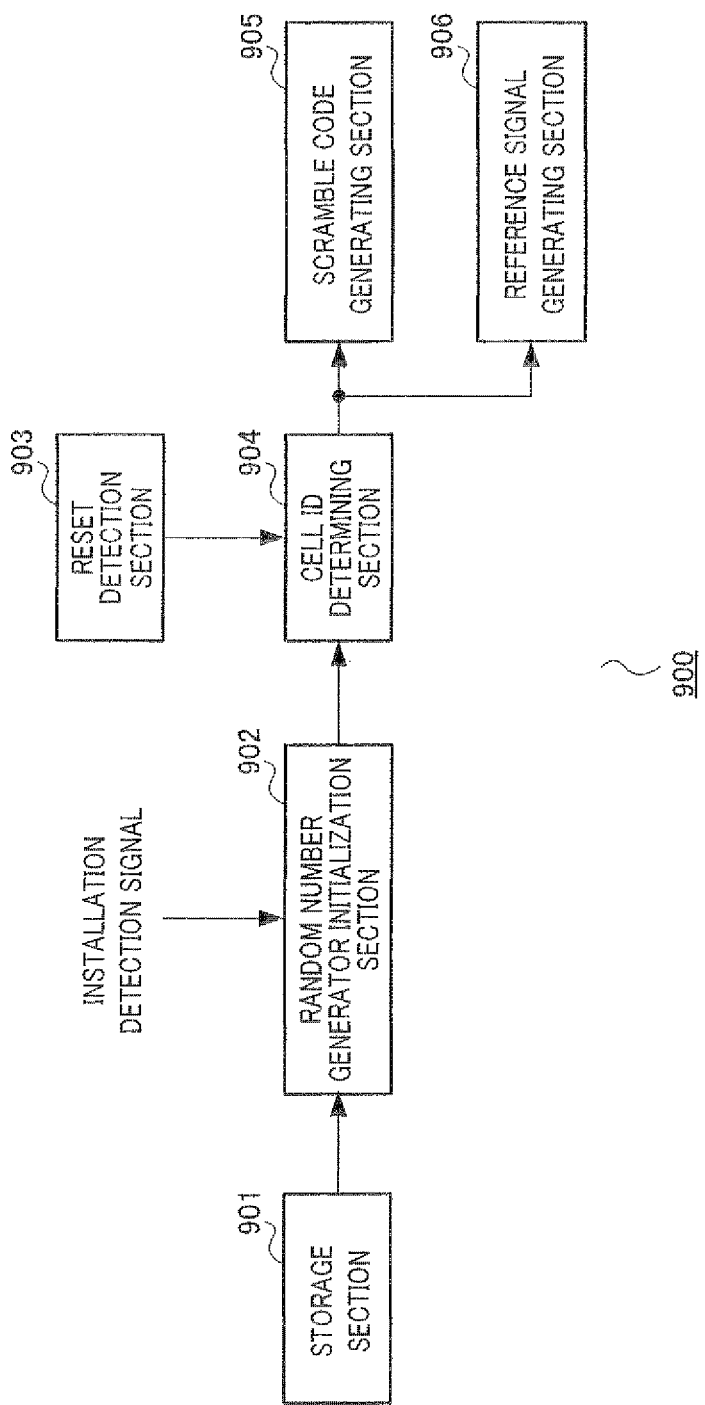
FIG. 9 is a block diagram showing the configuration of a base station apparatus according to Embodiment 4 of the present invention.

FIG. 9 is a block diagram showing the configuration of base station apparatus 900 according to Embodiment 4 of the present invention. Base station apparatus 900 is, for example, a femto cell and is a small base station apparatus that can be installed by a general user.

Base station apparatus 900 is mainly comprised of storage section 901, random number generator initialization section 902, reset detection section 903, cell ID determining section 904, scramble code generating section 905 and reference signal generating section 906.

Storage section 901 stores a MAC address which is a static parameter assigned to base station apparatus 900 beforehand. For example, storage section 901 stores "0x00-19-B9-0E-A7-B9" as the MAC address.

Upon receiving a installation detection signal for detecting that base station apparatus 900 has been installed by the user, random number generator initialization section 902 reads the MAC address assigned to base station apparatus 900 from storage section 901. Furthermore, random number generator initialization section 902 extracts a parameter for initialization of a random number generator from the read MAC address. For example, random number generator initialization section 902 extracts "B9" which are the least significant 8 bits of MAC address "0x00-19-B9-0E-A7-B9" and extracts "10111001" which is extracted "B9" converted to a binary number as a parameter for initialization. Random number generator initialization section 902 then outputs the extracted parameter to cell ID determining section 904.

Reset detection section 903 detects whether or not a reset is performed and outputs, when a reset is detected, the detection result to cell ID determining section 904.

Cell ID determining section 904 includes a random number generator and initializes the random number generator using the parameter for initialization inputted from random number generator initialization section 902. Furthermore, cell ID determining section 904 sets the cell ID using the initialized random number generator. Cell ID determining section 904 then outputs the set cell ID to scramble code generating section 905 and reference signal generating section 906. Furthermore, upon receiving the reset detection result from reset detection section 903 as input, cell ID determining section 904 performs linear feedback shift operation with the random number generator and updates the cell ID. A more specific configuration of the random number generator will be described later.

Scramble code generating section 905 generates a scramble code necessary to transmit a downlink signal using the cell ID inputted from cell ID determining section 904.

Reference signal generating section 906 generates a reference signal necessary to transmit a downlink signal using the cell ID inputted from cell ID determining section 904.

Figure 10:
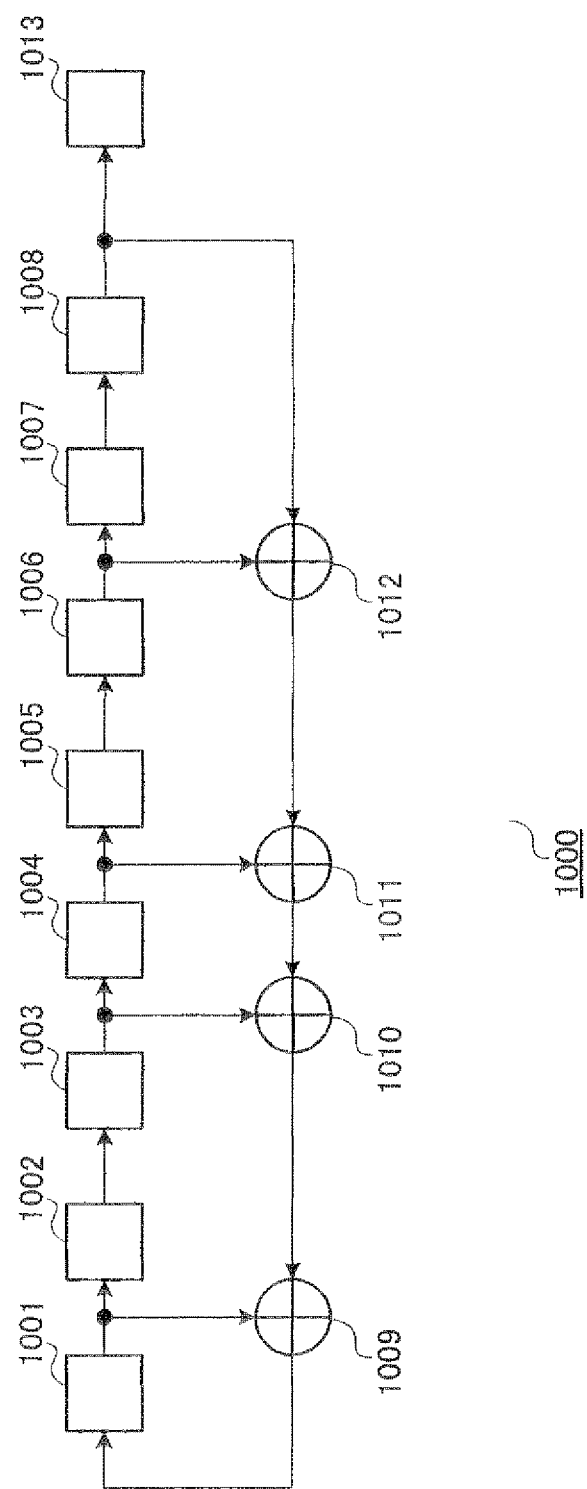
FIG. 10 is a block diagram showing the configuration of a random number generator according to Embodiment 4 of the present invention.

Next, the configuration of random number generator 1000 will be described using FIG. 10. FIG. 10 is a block diagram showing the configuration of random number generator 1000.

Random number generator 1000 is made up of shift registers 1001 to 1008, exclusive OR circuits 1009 to 1012 and output buffer 1013.

Shift registers 1001 to 1008 store parameter values inputted from random number generator initialization section 902. Furthermore, shift registers 1001 to 1007 perform linear feedback shift operation a predetermined number of times and thereby outputs the values they respectively store to right-hand shift registers 1001 to 1008 every time. Furthermore, shift register 1001 outputs the stored value to exclusive OR circuit 1009 and stores the value inputted from exclusive OR circuit 1009 through linear feedback shift operation. Furthermore, shift register 1003 outputs the stored value to exclusive OR circuit 1010. Furthermore, shift register 1004 outputs the stored value to exclusive OR circuit 1011. Furthermore, shift register 1006 outputs the stored value to exclusive OR circuit 1012. Furthermore, shift register 1008 outputs the stored value to exclusive OR circuit 1012 and output buffer 1013. Here, "initialization of the random number generator" means replacing values to store in shift registers 1001 to 1008 by values of the parameters inputted from random number generator initialization section 902. To be more specific, shift register 1001 replaces the value to store by most significant bit "1" of value "10111001" inputted from random number generator initialization section 902. Furthermore, shift register 1002 replaces the value to store by second highest bit "0." Shift registers 1003 to 1008 likewise replace the values they respectively store by the values of the third highest bit to the least significant bit respectively.

Exclusive OR circuit 1009 exclusive-ORs the value inputted from shift register 1001 and the value inputted from exclusive OR circuit 1010 and outputs the exclusive-OR result to shift register 1001.

Exclusive OR circuit 1010 exclusive-ORs the value inputted from shift register 1003 and the value inputted from exclusive OR circuit 1011 and outputs the exclusive-OR result to exclusive OR circuit 1009.

Exclusive OR circuit 1011 exclusive-ORs the value inputted from shift register 1004 and the value inputted from exclusive OR circuit 1012 and outputs the exclusive-OR result to exclusive OR circuit 1010.

Exclusive OR circuit 1012 exclusive-ORs the value inputted from shift register 1006 and the value inputted from shift register 1008 and outputs the exclusive-OR result to exclusive OR circuit 1011.

Output buffer 1013 stores the value inputted from shift register 1008.

Next, a method of setting a cell ID using random number generator 1000 will be described.

First, random number generator 1000 is initialized by replacing the states of shift registers 1001 to 1008 by values inputted from random number generator initialization section 902. Next, random number generator 1000 performs linear feedback shift operation a predetermined number of times. To be more specific, the value stored in shift register 1001 is outputted to right-hand shift register 1002 and shift register 1002 stores the value inputted from shift register 1001. Furthermore, the value stored in shift register 1002 is outputted to right-hand shift register 1003 and shift register 1003 stores the value inputted from shift register 1002. In the cases of shift registers 1004 to 1007, the stored values are likewise outputted to their respective right-hand shift registers. Shift register 1008 outputs the stored value to output buffer 1013. Furthermore, exclusive OR circuits 1009 to 1012 perform exclusive OR operation and the operation result from exclusive OR circuit 1009 is stored in shift register 1001.

Assuming that the number of linear feedback shifts is 100 and the bit size of output buffer 1013 is 16 bits, random number generator 1000 finally obtains binary value "0010011010010010." Cell ID determining section 904 converts a binary value obtained in random number generator 1000 to a hexadecimal value, further adds "0x" to the head thereof and sets "0x2692" as the cell ID.

Thus, according to the present embodiment, the base station apparatus sets a cell ID of the base station apparatus from the stored MAC address of the base station apparatus, and can thereby easily set the cell ID when cell ID setting is necessary in the base station apparatus installed by a general user. Furthermore, according to the present embodiment, the base station apparatus autonomously sets the cell ID using the MAC address, which allows the base station apparatus to operate by plug and play. Furthermore, according to the present embodiment, since a cell ID is set using the MAC address, it is not necessary to store dedicated information for the cell ID setting and it is thereby possible to set the cell ID as appropriate without increasing the capacity of memory mounted on the base station apparatus.

In the present embodiment, the random number generator is initialized using the MAC address, but the present embodiment is not limited to this, and the random number table may be initialized using the IP address, time information or base station apparatus name by applying the present embodiment to above Embodiments 1 to 3. Furthermore, in the present embodiment, the cell ID is set using the MAC address, but the present embodiment is not limited to this, and the cell ID can be set using an arbitrary address other than the MAC address assigned to the base station apparatus. Furthermore, in the present embodiment, a linear feedback shift register is used as the random number generating section, but the present embodiment is not limited to this, and an arbitrary random number generation algorithm such as linear congruential method may also be used.

In Embodiments 1 to 4 above, the cell ID is set using the IP address, time information, base station apparatus name or MAC address, but the present invention is not limited to this, and the cell ID may also be set using uplink frequency, hopping mode, sounding reference signal configuration or the like.

The disclosure of Japanese Patent Application No. 2009-48473, filed on Mar. 2, 2009, including the specification, drawings and abstract, is incorporated herein by reference in its entirety.

INDUSTRIAL APPLICABILITY

The base station apparatus and method of setting a cell ID according to the present invention is suitable for use in autonomously determining a cell ID particularly when a user installs the base station apparatus.

The invention claimed is:
1. A femto cell base station device comprising:
a receiver that receives a Network Time Protocol message from a server by an Internet protocol (IP) communication via an IP network, the server being available to perform the IP communication with the femto cell base station device;
an extractor that extracts parameters related to the IP communication and included in the received message received by the IP communication;
a setter that sets a cell ID based on the extracted parameters related to the IP communication, the cell ID uniquely identifying a femto cell from other femto cells which are formed by the femto cell base station device within a macro cell; and
a reference signal generator that generates a reference signal used to transmit a downlink signal in a radio communication, the reference signal being generated by using the set cell ID.

2. The femto cell base station device according to claim 1, wherein the extractor extracts an internet protocol address assigned to the femto cell base station device as the parameter.

3. The femto cell base station device according to claim 1, wherein the extractor extracts time information as the parameter.

4. The femto cell base station device according to claim 1, further comprising a scramble code generator that generates a scramble code by using the set cell ID.

5. The femto cell base station device according to claim 1, wherein the receiver receives the message via an Internet network.

6. A method of setting a cell ID for a femto cell base station device, the method comprising:
   receiving, by a receiver, a Network Time Protocol message from a server by an Internet protocol (IP) communication via an IP network, the server being available to perform the IP communication with the femto cell base station device;
   extracting parameters related to the IP communication included in the received message received by the IP communication;
   setting the cell ID based on the extracted parameters related to the IP communication, the cell ID uniquely identifying a femto cell from other femto cells formed by the femto cell base station device within a macro cell; and
   generating a reference signal necessary to transmit a downlink signal in a radio communication, the reference signal being generated based on the set cell ID.

7. The method according to claim 6, wherein the receiver receives the message via an Internet network.

* * * * *